Patented Jan. 22, 1924.

1,481,697

UNITED STATES PATENT OFFICE.

WILLIAM HENRY DYSON, OF NORMANDY, NEAR GUILDFORD, AND LESLIE AITCHISON, OF BIRMINGHAM, ENGLAND.

CONCENTRATION OF METALLIC VALUES OF ORES, METALLIFEROUS RESIDUES, AND THE LIKE.

No Drawing.   Application filed October 4, 1921.   Serial No. 505,362.

*To all whom it may concern:*

Be it known that we, WILLIAM HENRY DYSON, a subject of the King of England, residing at Normandy, near Guildford, Surrey, England, and LESLIE AITCHISON, a subject of the King of England, residing at Birmingham, Warwickshire, England, have invented certain new and useful Improvements in the Concentration of Metallic Values of Ores, Metalliferous Residues, and the like, of which the following is a specification.

The present invention is for improvements in and relating to the treatment of ores and other metalliferous materials containing oxides of metals of the tungsten group such, for example, as tungsten and chromium, for the purpose of effecting the separation of the metallic values, and in particular of the metal of the said group.

We have found that oxides of metals of the tungsten group such as tungsten and chromium may be directly transformed into volatile halogen derivatives, i. e. without the addition to the reaction mixture of a carbonaceous or sulphur-bearing reducing agent, and that the production of volatile halogen compounds in this way is applicable to the treatment of materials containing oxidized metals of the aforesaid group for the recovery of the metallic values on a commercial scale.

According to the present invention therefore, the process for the separation of a metal of the tungsten group (for example, tungsten or chromium) from metalliferous materials containing such a metal in oxidized form by a process of the type wherein the metalliferous material is heated in presence of chlorine and one or more of the metallic components is or are volatilized as chloro-derivatives, is characterized by heating the oxidized material by itself, (that is to say, in the absence of any carbon-or-sulphur-bearing reducing agent) in the dry way in a halogen atmosphere (for example, free halogen, such as chlorine or gaseous halogen acid, such as hydrochloric acid gas) at a sufficiently high temperature to bring about the direct conversion of the oxidized metal of said group into a halogen derivative and to effect the volatilization thereof.

A mixture of halogen and gaseous halide acid may be employed, and in the case when the latter alone is used it may be found advantageous to introduce hydrogen therewith. Such addition of hydrogen may be made at any convenient stage of the process.

The tungsten or the like may be distilled over simultaneously with the associated metals which form halogen derivatives of greater volatility, but it is preferred to effect the recovery of the tungsten or the like and other metallic values, such, for example, as tin, by selective formation and distillation of the respective halogen derivatives. This may be accomplished by changing the temperature, or by varying the nature of the halogen atmosphere. Thus, it may be found that the use of a mixture of halogen and halide acid gas will permit of operating at a lower temperature than that required to obtain the same result with the halogen alone. In other cases, the same reagent may be employed for effecting the volatilization of different components of the metalliferous material under treatment.

Mixed vapors of the kind in question may be condensed and collected together, or the metallic values recovered separately by fractional condensation in known manner. Alternatively, separation may be effected by passing the mixed vapors into an appropriate solvent for one or other of the vapor constituents, for example, a dilute acid. The vapors produced in selective formation of the halogen derivatives of different metals may likewise be passed into a suitable reagent to dissolve the metallic component or precipitate it, as may be desired.

The conditions of reaction will, of course, be adjusted to meet the circumstances of the particular case. The temperature, and the form in which the halogen is employed, are factors necessarily dependent upon the nature of the material undergoing treatment and whether or not a particular component or a number of components is to be volatilized. In any given case, however, the conditions of operation may be readily determined by a simple preliminary trial. As illustrative of such adjustment of conditions, it may be mentioned that for volatilizing iron away from chromium in the resolution of chromite, gaseous hydrochloric acid in conjunction with hydrogen is a satisfactory reagent. On the other hand, the use of this acid alone appears less satisfactory for the volatilization of the chromium than free chlorine. or chlorine together with hydrochloric acid gas, the temperature conditions remaining the same.

In other cases, by adjusting the temperature conditions, the same reagent may be used for the successive or simultaneous volatilization of different components of the ore or the like.

Silica and certain metallic oxides, for example, those of aluminum and magnesium, do not lend themselves to separation by volatilization within the practical temperature limits which would ordinarily be employed under the simplified conditions characterizing this invention.

The ore or the like may be submitted to such preliminary treatment as is customary in the art, and should be brought into intimate contact with the halogen atmosphere, for instance, by stirring or agitation in any other suitable manner while the material is subject to the action of the gas.

The following examples will serve to indicate how the invention may be carried into effect, it being understood that these examples are given for illustrative purposes and not by way of limitation:—

*Example I.*

Roughly broken chromite is introduced into an ordinary tubular furnace lined with a siliceous refractory, and is raised to a temperature of 900° C. A current of hydrochloric acid gas and hydrogen, in equal volumes, is then passed over the heated ore, and the passage of the gases is continued until iron ceases to come over in the vapours. Substantially the whole of the chromium remains in the residue in the form of chromic oxide, a small proportion only being volatilized along with the iron. The temperature is then raised to 1200° C., and chlorine gas is passed over the residue, whereby the chromium is distilled away.

By operating from the commencement at 1200°, either in the presence of chlorine or of chlorine and gaseous hydrochloric acid, both the iron and the chromium are simultaneously volatilized, leaving as residue the earthy impurities, alumina, silica, etc.

*Example II.*

Fragments of wolframite are charged into a furnace having an acid-proof lining, and provided with an agitating device, and the temperature is brought to 600° C. A mixture composed of equal volumes of chlorine and hydrochloric acid gas is then led over the heated ore, which is maintained in gentle agitation during the passage of the gases. There results a distillate containing the whole of the tin, together with a small proportion, 1–2 per cent, of tungsten.

The residue is raised to 1000° C., and the same gaseous mixture is passed over it. The tungsten, iron and manganese are volatilized together, earthy impurities only, alumina, silica etc. remaining as residue. The vapours are led into water, whereby the iron, manganese, etc. go into solution, while the tungsten is precipitated. On washing the precipitate and igniting it, tungstic oxide is obtained. Owing to the nature of the gases, the water into which the vapours are led is virtually a solution of hydrochloric acid. It is, however, an advantage to utilize an acid solution from the start, as thereby the chance of precipitation of other metals along with the tungsten is reduced. This applies more particularly when the tin and the tungsten are carried over together, as in the succeeding example.

*Example III.*

Crushed scheelite is heated to 1000° in a current of hydrochloric acid gas alone. Under these conditions the tin, tungsten, iron and manganese are all simultaneously volatilized. The acid vapours are led into a solution of hydrochloric acid as before.

If the concentration of acid in the solution receiving the vapours becomes sufficiently high to dissolve the tungsten, the latter may be completely precipitated by diluting the solution and boiling it.

Temperatures lower than those given in the above examples may be employed, but the reactions are then slower, the other conditions of operation remaining the same.

When the tungsten ore contains excess of tin, it may be found advisable to have carbon present, or to introduce hydrogen along with the halide acid gas.

It will be understood that when a reducing atmosphere is used according to this invention it must be one compatible with the form of the halogen employed; for instance hydrogen may be employed in conjunction with hydrochloric acid, but not with free chlorine for obvious reasons.

In some cases, the ore to be treated may contain a constituent in the form of a free precious metal (such as gold) associated with the other metals.

We claim:

1. The process for the separation of a metal of the tungsten group from metalliferous materials containing such a metal in oxidized form which comprises heating the oxidized material out of contact with any carbon or sulphur bearing reducing agent in the dry way in a halogen atmosphere at such a temperature as to bring about the direct conversion of the oxidized metal of said group into a halogen derivative and effect the volatilization thereof.

2. The process for the separation of a metal of the tungsten group from metalliferous materials containing such a metal in oxidized form which comprises heating the oxidized material out of contact with any carbon or sulphur bearing reducing agent in the dry way in a halogen atmosphere with hydrogen at such a temperaure as to bring about the direct conversion of the oxidized metal of the said group into a halogen derivative and effect the volatilization thereof.

3. The process for the separation of a metal of the tungsten group from metalliferous materials containing such a metal in oxidized form which comprises heating the oxidized material out of contact with any carbon or sulphur bearing reducing agent in the dry way in an atmosphere containing free halogen at such a temperature as to bring about the direct conversion of the oxidized metal of the said group into a halogen derivative and effect the volatilization thereof.

4. The process for the separation of a metal of the tungsten group from metalliferous materials containing such a metal in oxidized form which comprises heating the oxidized material out of contact with any carbon or sulphur bearing reducing agent in the dry way in a halogen atmosphere at such a temperature as to bring about successively the direct conversion of the oxidized metals present in said material into the respective halogen derivatives and effect the substantially separate volatilization thereof.

5. The process for the separation of a metal of the tungsten group from metalliferous materials containing such a metal in oxidized form which comprises heating the oxidized material out of contact with any carbon or sulphur bearing reducing agent in the dry way in a chlorinating atmosphere at such a temperature as to bring about the direct conversion of the oxidized metal into a chloro-derivative and effect the volatilization thereof.

6. The process for the separation of a metal of the tungsten group from metalliferous materials containing such a metal in oxidized form which comprises heating the oxidized material out of contact with any carbon or sulphur bearing reducing agent in the dry way in an atmosphere of free chlorine at such a temperature as to bring about the direct conversion of the oxidized metal into a chloro-derivative and to effect the volatilization thereof.

7. The process for the separation of a metal of the tungsten group from metalliferous materials containing such a metal in oxidized form which comprises heating the oxidized material out of contact with any carbon or sulphur bearing reducing agent in the dry way in a chlorinating atmosphere at such a temperature as to bring about successively the direct conversion of the oxidized metals present in said material into the respective chloro-derivatives and to effect the substantially separate volatilization thereof.

8. The process for the separation of tungsten from metalliferous materials containing this metal in oxidized form which comprises heating the oxidized material out of contact with any carbon or sulphur bearing reducing agent in the dry way in a chlorinating atmosphere at such a temperature as to bring about the direct conversion of the oxidized tungsten into a chloro-derivative and to effect the volatilization thereof.

9. The process for the separation of tungsten from metalliferous materials containing this metal in oxidized form which comprises heating the oxidized material out of contact with any carbon or sulphur bearing reducing agent in the dry way in an atmosphere containing gaseous hydrochloric acid at such a temperature as to bring about the direct conversion of the oxidized tungsten into a halogen derivative and to effect the volatilization thereof.

10. The process for the separation of tungsten from metalliferous materials containing this metal in oxidized form which comprises heating the oxidized material out of contact with any carbon or sulphur bearing reducing agent in the dry way in an atmosphere containing hydrochloric acid gas and free chlorine at such a temperature as to bring about the direct conversion of the oxidized tungsten into a halogen derivative and to effect the volatilization thereof.

11. The process for the separation of tungsten from oxidized tungsten ores which comprises heating the ore out of contact with any carbon or sulphur bearing reducing agent in the dry way in an atmosphere containing hydrochloric acid gas at a temperature of substantially 1000° C. for the purpose of bringing about the direct conversion of the oxidized metals into chloro-derivatives and effecting the volatilization thereof.

12. The process for the separation of tungsten from metalliferous materials containing this metal in oxidized form which comprises heating the oxidized material out of contact with any carbon or sulphur bearing reducing agent in the dry way in a chlorinating atmosphere and converting successively the oxidized metals of the material into their respective chloro-derivatives and effecting the substantially separate volatilization thereof.

In testimony whereof we have signed our names to this specification.

WILLIAM HENRY DYSON.
LESLIE AITCHISON.